June 16, 1925.                                                            1,542,404
F. PAULSON
ARTIFICIAL BAIT
Filed May 31, 1923
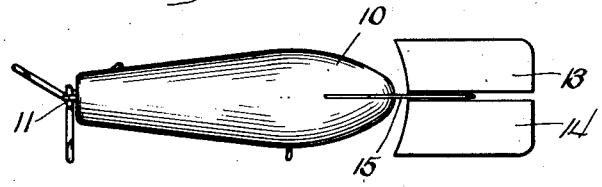
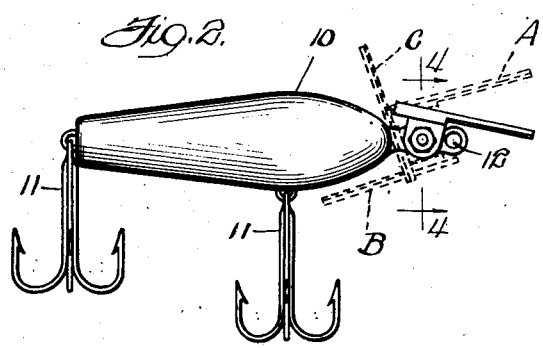
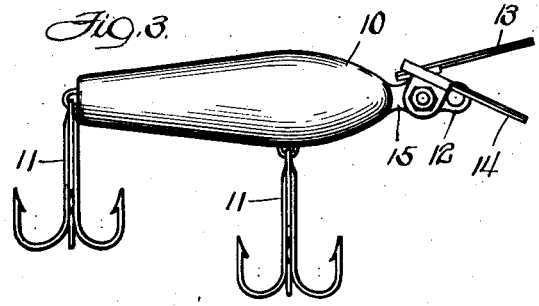
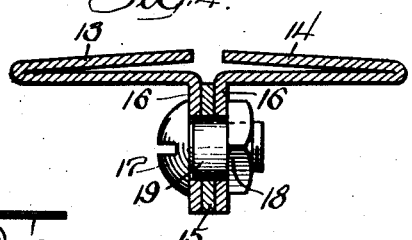
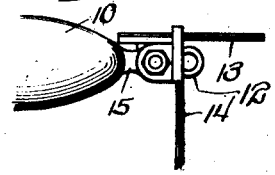
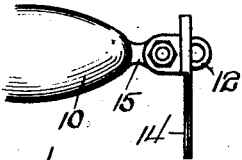
Inventor:
Fred Paulson
By Jones, Addington, Ames & Seibold
Attys Patented June 16, 1925.

1,542,404

UNITED STATES PATENT OFFICE.

FRED PAULSON, OF GENEVA, ILLINOIS.

ARTIFICIAL BAIT.

Application filed May 31, 1923. Serial No. 642,387.

*To all whom it may concern:*

Be it known that I, FRED PAULSON, a citizen of the United States, residing at Geneva, in the county of Kane and State of Illinois, have invented new and useful Improvements in Artificial Baits, of which the following is a full, clear, concise, and exact description, reference being had to the accompanying drawing, forming a part of this specification.

My invention relates to artificial baits.

One of the objects of my invention is to provide an artificial bait, with improved means for controlling its movement as it is drawn through the water, and which can be adjusted so that the bait will act as a surface bait, as a diving bait, or as a spinning bait.

A further object of my invention is to provide an artificial bait having a pivoted controlling plane in which the line-tie is not mounted on the controlling plane.

A further object of my invention is to provide an artificial bait with a controlling plane or planes having a considerable range of adjustment so that they can be moved to any desired position to give the bait different movements.

A still further object of my invention is to provide improved means for mounting the planes for pivotal movement and holding them in adjusted position.

Further objects will appear from the description and claims.

In the drawings in which an embodiment of my invention is shown—

Figure 1 is a top view of an artificial bait;

Fig. 2 is a side elevation view of Fig. 1;

Fig. 3 is a side elevational view showing a different adjustment of the planes;

Fig. 4 is a section of line 4—4 on Fig 2;

Fig. 5 is a fragmentary view showing another adjustment of the planes; and,

Fig. 6 is a fragmentary view of stil another adjustment.

Referring now to the drawings in detail, the artificial bait shown comprises a body portion 10, which may be of wood having a water proof enameled coating, a number of hooks 11, mounted on the body 10, and means at the front end of the bait controlling the movement of the bait as it is drawn through the water by a line secured to the line-tie at 12.

The means for controlling the movement of the bait are so designed that the bait may be used as a surface bait, a diving bait, a leaping bait, or as a spinning bait. These means comprise a pair of independently adjustable planes or wings 13 and 14, pivoted to swing about a horizontal transverse axis.

Fig. 2 shows in full line one position of the planes when the bait is used as a diving bait.

A position of the planes when the bait is used as a surface bait is indicated by the dotted line at A in Fig. 2.

With the planes in the position shown in dotted lines at B the bait will leap along the surface of the water as the line is reeled rapidly.

Fig. 3 shows the position of the planes for giving a spinning movement to the bait, one of them inclined upwardly and forwardly, and the other being inclined downwardly and forwardly which will cause the bait to turn over and over in the water with a spinning movement as it is drawn along in the water.

As shown in Fig. 2, the planes have a wide range of adjustment from the position shown in the dotted line at B to the position shown in the dotted line at C. Each setting of the planes between the two positions will give a different movement to the bait.

With the planes set as shown in Fig. 5, the bait will assume a sidewise position when it is drawn through the water, while with the planes set as shown in Fig. 6 it will have a short wiggling motion like a minnow.

In order that the adjustment of the planes may not be disturbed by the pull on the line, I secure the line independently of the planes. The planes are pivotally mounted on a flat metal line-tie member 15, which extends from the body portion 10. Each of the planes 13 and 14 is provided with an L shaped lug or ear 16, which engages the line-tie member 15 (see Fig. 4). The planes 13 and 14 slope slightly downwardly from the inner to the outer edge, as shown in Fig. 4. The L-shaped lugs 16, it will be noted, extend from the outer edges of the plane. The purpose of having these lugs extend from the outer edge rather than from the inner edge was to give a rounded portion at the outer edge of the plane to lessen the danger of cutting one's finger in adjusting the planes and also to give a double ply to be grasped in adjusting the planes.

The planes are secured to the line-tie member 15 and held in adjusted position thereon by means of a screw 17 threaded into a nut 18 having a tubular portion 19, which extends through registering openings in the ears 16 and line-tie member 15, the tubular portion 19 providing a bearing for the pivotal movement of the planes 13 and 14.

The use of the bait has been outlined in connection with the description of the construction. Briefly, the fisherman can set the planes 13 and 14 at any angle he desires, the planes being adjusted either together or independently to give any desired movement to the bait. The planes can then be set and clamped in adjusted position by tightening up the screw 17.

While I have shown but one form of my invention, it may be embodied in other forms covered and defined by the claims.

Having thus described my invention what I claim as new and desire to secure by Letters Patent of the United States is:

1. An artificial bait having a body portion, hooks mounted thereon, a member extending forwardly therefrom and having a line-tie at its front end, and a pair of water engaging planes pivotally mounted on each side of said forwardly extending member back of the line-tie.

2. An artificial bait comprising a body portion, hooks on said body portion, and means whereby said bait may be caused to dive, spin or skim the surface, comprising a pair of planes independently adjustable about a horizontal transverse axis, said planes when adjusted to the same angle being so close together for a considerable portion of their length as to constitute substantially a single continuous plane.

3. An artificial bait comprising a body portion, hooks on said body portion, and means whereby said bait may be caused to dive, spin or skim the surface, comprising a pair of planes independently adjustable about a horizontal transverse axis, the axis of said planes being in advance of the front end of the body.

4. An artificial bait comprising a body portion, hooks on said body portion, and means whereby said bait may be caused to dive, spin or skim the surface, comprising a pair of planes independently adjustable about a horizontal transverse axis, said planes being close together for a considerable portion of their length when adjusted to the same angle, the axis of said planes being in advance of the front end of the body.

In witness whereof, I have hereunto subscribed my name.

FRED PAULSON.